C. J. PILLING.
PRESSURE GAGE.
APPLICATION FILED APR. 25, 1912.

1,204,483.

Patented Nov. 14, 1916.

WITNESSES

INVENTOR
Charles J. Pilling
BY
ATTORNEY

UNITED STATES PATENT OFFICE.

CHARLES J. PILLING, OF PHILADELPHIA, PENNSYLVANIA.

PRESSURE-GAGE.

1,204,483.  Specification of Letters Patent.  Patented Nov. 14, 1916.

Application filed April 25, 1912. Serial No. 693,014.

*To all whom it may concern:*

Be it known that I, CHARLES J. PILLING, citizen of the United States, residing in the city of Philadelphia, State of Pennsylvania, have invented certain new and useful Improvements in Pressure-Gages, of which the following is a full, clear, and exact description, reference being had to the accompanying drawings, forming a part of this specification.

My invention relates to air-pressure gages, adapted more particularly for measuring and indicating, with great accuracy, maximum pressures and variations thereof in surgical apparatus wherein compressed air is the motive or actuating force employed.

My invented device involves to a great extent the principles of construction and operation of that heretofore invented jointly by Dr. Francis Ashley Faught and myself and which forms the subject of our U. S. Patent No. 1089122 dated March 3, 1914; the object of the present invention being to simplify and improve some elements of that apparatus and make the operation more perfect.

To these ends my improved apparatus consists of the novel features hereinafter set forth and pointed out in the appended claims.

Figure 1:
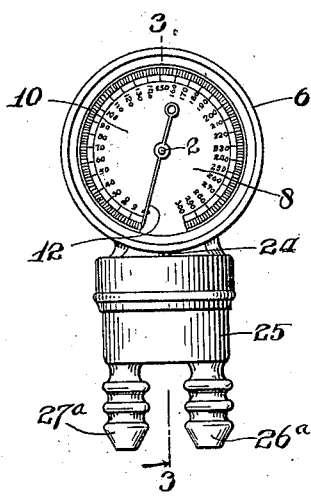
Figure 2:
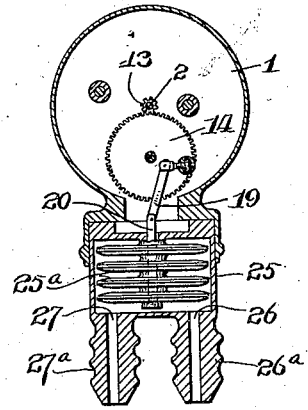
Figure 3:
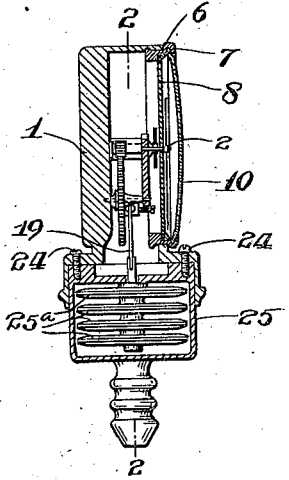
Figure 4:
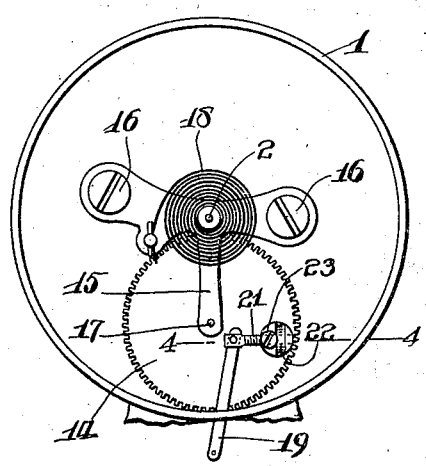
Figure 5:
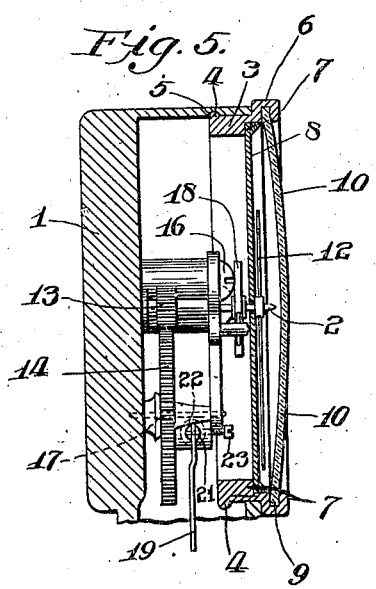
Figure 6:
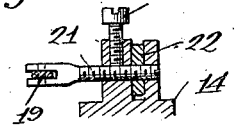

In the drawings illustrating my invention, Figure 1 is an elevation of the complete device. Fig. 2 a section on line 2—2 of Fig. 3; Fig. 3 a section on line 3—3 of Fig. 1; Fig. 4 an enlarged plan view of the dial casing with the dial-plate and glass cover removed, and the bellows chamber also removed. Fig. 5 is an enlarged sectional view, similar to Fig. 3 with the bellows chamber removed, and showing the dial-spindle operating mechanism in full, including elements shown in Fig. 4. Fig. 6 is a section on the line 4—4 of Fig. 4.

Referring now to said drawings, the dial-casing 1 of the apparatus is shown therein as a shallow cylindrical box, composed of a base-plate and a peripheral wall having an interior annular groove 5 formed therein; the otherwise open top of the casing being closed by the dial and dial-carrying cap, which latter forms a most important feature of the improvement and will be first described herein. Said dial-casing 1 operatively supports and incloses the mechanism hereinafter described, which directly actuates a rotatable spindle 2 carrying the dial-pointer. Hence the function sought in the dial-carrying element is the provision of relative rotative adjustability of the dial and the rotatable dial pointer carried by said spindle. This is effected by making said dial-carrying element in the form of a closing cap for the casing 1; and it consists of a ring-like frame 6 having a depending flange 3 of lesser diameter, said flange being provided exteriorly with an annular bead 4 adapted to register rotatably with the groove 5 in the perpendicular periphery of the casing 1. The flange 3 therefore extends within the casing and the cap frame 6 rests upon the upper edge of its peripheral wall. This construction of the frame 6 also provides an offset on and by which to fixedly support and carry a disk-shaped scale-marked dial plate 8. The cap frame 6 is grooved interiorly, as at 7, in order to insert therein the rim edge of a convexed glass disk 10, thereby covering the dial-plate 8 and movable pointer 12, and holding said dial-plate fixedly in the cap frame 6. The dial plate 8 is centrally apertured to admit the projecting end of the rotatable spindle 2, hence the pointer 12 carried by said spindle has free movement in a plane over the normally fixed dial; while rotatable movement for adjustment relatively to the pointer, when the latter is in a state of rest, is readily effected by a movement of the dial-carrying cap-frame 6 within the casing wall, through the medium of the coacting bead 4 and groove 5 before described.

The construction described is best shown in detached and enlarged sectional view Fig. 5, from which it will be seen that as the dial plate and its glass covering are fixedly mounted in the cap 6, and the dial pointer and its rotatable actuating spindle are operatively independent thereof, a rotative movement of the cap in the groove 5 of the casing, will carry with it the dial plate, bringing its zero mark in register with the dial pointer 12 (see Fig. 1), an easy adjustment which, when made after each use of the apparatus, results in absolute accuracy of measurement of pressure passing through the gage, which is a most important capacity, because in all such devices slight inaccuracies due to friction and wear are inevitable, without means to adjust the elements to compensate therefor.

The mechanism contained in the casing for directly rotating the spindle which carries the dial pointer consists of a small pinion 13 on the spindle 2, actuated by meshing with the toothed periphery of a relatively much larger cog wheel 14 operatively supported on the basal end of the casing by a spacing bearing 17 and between it and a bracket 15 whose arms are attached by screws 16, 16. And to this bracket is attached a spring 18 coiled around the spindle 2 operating to restore it to normal position after being released by the actuating mechanism which rotatively moves it in the opposite direction.

The toothed wheel 14, which directly imparts motion to the spindle-actuating pinion 13 is concentrically hung on a pivot pin of its bearing 17 before described, and it has an oscillatory movement in an arc of a circle, effected by the spring 18 in one direction and by the bellows-actuated rod 20, hereinafter described, through the medium of a connecting link device 19 and 21, (as shown in Fig. 4). The element 19 of said link device is pivotally connected at its lower end to the upper and free end of the bellows rod 20 (see Fig. 3), and said link member 19, is likewise pivotally connected at its other end to the free end of the short link member 21 which is in the form of a threaded or screw member, adjustably held in place eccentrically on the face of the cog wheel 14 by a perforated retaining post, said post being mounted fixedly on the face of the toothed wheel 14, the point of the threaded link 21 passing through a perforation in said retaining post and entering the threaded bore of an adjusting wheel 22 mounted in a recess in said retaining post, whereby on rotating said wheel the length of the throw of the link can be varied. It is obvious therefore that by so lengthening, by adjustment, the threaded link 21, its action on link 19 will be such that the reciprocation of the bellows rod 20 will have greater or less effect, as may be, to govern the arc of oscillatory movement of the cog-gearing 14 of the dial-actuating mechanism.

The casing 1 has a segmental opening in its peripheral wall and a surrounding annular flange X, which latter is threaded or otherwise fitted tightly over the upper part of a corresponding-shaped chambered element 25; and within the latter is contained a collapsible bellows device 25ª mounted on a rod 20 which is fixed to the lower plate of the bellows device and passes through a central opening in the several plates thereof; the rod having longitudinal reciprocating motion as the bellows is collapsed and expanded, respectively. As the chambered element 25 is constructed and operated as a normally closed air chamber, the bellows device 25ª and rod 20 are placed and held in position in the chambered element 25 by means of a closing cap or washer X¹ which is soldered to the top of the element 25 and forms, in effect, an integral part of said element 25; and the annular flange of the casing 1 then fitted tightly over the upper end of element 25 and secured to said cap or washer X¹ by screws 24. The washer X¹ is centrally perforated to allow the upper end of rod 20 to pass through it. The bellows device is of a character adapted to be collapsibly actuated solely by the pressure of compressed air admitted to said chamber through an inlet opening 26 provided with a nipple 26ª. It is restored to normal distended position, by mechanical means, such as the rod 20 and the connecting actuating elements between it and the spring-tensioned dial spindle, after such air-pressure is released through another aperture 27 provided with a nipple 27ª. These nipples are adapted, as usual, by corrugated surfaces, to detachably attach thereto, flexible tubes, one leading to a source of compressed air supply and the other to a medium of operative discharge. A rod 20 is suitably mounted on the base plate of the bellows, and hence the latter imparts reciprocatory movement to said rod. I prefer to employ the specific construction of bellows shown and described in the aforesaid U. S. patent issued to Dr. Faught and myself, but this is not essential, provided any substituted form of bellows performs the function and has the mode of operation above described. The bellows rod 20 is pivoted to the free end of link 19, which has the operation before mentioned.

Having thus described my invention, I claim as new and desire to secure by Letters Patent:

1. A pressure gage of the class recited comprising in combination an open topped cylindrical containing case, an annular closing cap thereon, said casing and said cap having interposed engaging means coacting to permit rotatable adjustment of the cap relatively to the casing without withdrawal therefrom, a centrally apertured dial plate, a glass disk carried by said cap outwardly of and spaced from said dial plate, means to secure said dial plate and glass disk fixedly in said rotatable cap, a spindle rotatably mounted in said casing and projecting through said aperture in the dial plate, a dial pointer on said spindle between the dial plate and glass disk, and mechanism in said casing to impart rotatable motion to said spindle.

2. A pressure-gage of the class recited, comprising in combination an open-topped containing casing, a rotatably mounted spindle and mechanism to impart such motion thereto, operatively mounted in said casing, a closing cap for said casing consisting of an annular body having a depending flange of lesser diameter, said casing and cap flange including a coinciding annular bead and an annular groove adapted to register in such manner as to enable said casing and flanged cap to be rotatably adjustable, a scale-marked dial-plate centrally-apertured and supported on said flange of the cap, means to fixedly hold said dial-plate immovably thereon, and a dial-pointer mounted on the projecting end of said spindle and adapted to be rotatably moved thereby.

3. A pressure-gage of the class recited, comprising in combination an open-topped cylindrical casing which is annularly grooved interiorly, a rotatably mounted spindle and mechanism to impart such motion thereto, operatively mounted in said casing, a closing cap consisting of an annular body portion interiorly grooved and having a depending flange of lesser diameter provided with an exterior annular bead adapted to register rotatably with said interior annular groove in the casing, a scale-marked dial-plate centrally apertured and supported on said flange of the cap, a glass disk over said dial-plate fixedly held by its rim in said interior annular groove in the cap, and a dial-pointer mounted on the projecting end of said spindle and adapted to be rotatably moved thereby.

4. In a pressure-gage, the combination of a casing, a dial-plate, a rotatable spindle, a dial pointer carried by the spindle adjacent to the dial-plate, a gear wheel, means whereby the gear wheel is caused to turn said spindle, a post on said gear wheel and having a guide opening therein, a member adjustable in said guide opening toward and from the center of said wheel, means to secure said member to said post in different positions of adjustment, pressure mechanism having a pressure operated movable part, and a link connecting said member and said part.

5. In a pressure gage, the combination of a casing, a dial-plate, a rotatable spindle, a dial pointer carried by the spindle adjacent to the dial-plate, a gear wheel, means whereby the gear wheel is caused to turn said spindle, a post on said gear wheel and having a guide opening therein, a member adjustable in said guide opening toward and from the center of said wheel, means operative to adjust said member relatively to said post, pressure mechanism having a pressure operated movable part, and a link connecting said member and said part.

6. In a pressure gage, the combination of a casing, a dial-plate, a rotatable spindle, a dial pointer carried by the spindle adjacent to the dial-plate, a gear wheel provided with means to cause it to turn said spindle, a recessed post on said gear wheel and having a guide opening therein, a screw-threaded member adjustable in said guide opening toward and from the center of said wheel, a screw threaded wheel engaging the recess of said post and the screw threads of said member and operative to adjust said member relatively to said post, pressure mechanism having a pressure operated movable part, and a link connecting said member and said part.

7. A pressure gage of the class recited comprising in combination a dial casing having a flanged opening in its peripheral wall, a dial plate and dial-actuating mechanism mounted therein, a second casing constituting a pressure chamber, apertured at one end and with air inlet and discharge ports opposite thereto, said casing being mounted within and supported by the flange of the dial casing and hence transversely-disposed relatively to and directly communicating through its coinciding apertured end with the interior of said dial casing, collapsible means in said pressure chamber adapted to be actuated by variations of air-pressure therein, a rod reciprocated directly by said collapsible means and extending into the flanged opening of the dial casing, and a connecting member to communicate movement imparted by the rod to the dial pointer actuating devices.

In testimony whereof I have hereunto affixed my signature this fifteenth day of April, A. D. 1912.

CHARLES J. PILLING.

Witnesses:
A. M. BIDDLE,
R. A. DUNLAP.